A. T. LIGHT.
ICE CREAM FREEZER.
APPLICATION FILED JULY 25, 1919.

1,380,913.

Patented June 7, 1921.

INVENTOR
Albert T. Light
BY
Frank J. Kent
ATTORNEY

UNITED STATES PATENT OFFICE.

ALBERT T. LIGHT, OF NEW YORK, N. Y.

ICE-CREAM FREEZER.

1,380,913.  Specification of Letters Patent.  Patented June 7, 1921.

Application filed July 25, 1919. Serial No. 313,400.

*To all whom it may concern:*

Be it known that I, ALBERT T. LIGHT, a subject of the King of Great Britain and Ireland, residing at New York, in the county of Bronx and State of New York, have invented certain new and useful Improvements in Ice-Cream Freezers, of which the following is a specification.

My present invention relates particularly to relatively large ice cream freezers of the so-called "horizontal" type.

Special objects of the invention are to accurately support and center the beater mechanism and to enable observation and inspection of said beater mechanism while the same is in operation.

Another object of the invention is to so construct the parts that the gear box and the freezing vessel may be readily separated without disturbing the gearing.

In the accomplishment of the foregoing objects I have constructed the freezing vessel with a removable head giving access to the interior of the vessel and have supported the outer end of the beater on a bearing carried by a spider-like structure which is entirely independent of the cover and which will support the beater in position while the cover is raised and the interior of the vessel is therefore open for inspection.

Also the gear box and the freezing vessel are preferably constructed as separate mechanical units which may be readily assembled or separated without taking down the gearing.

Other features of the invention and details of construction will appear as the specification proceeds.

In the accompanying drawing I have illustrated but one embodiment of my invention, but contemplate that this structure may be modified in various respects without departure from the true spirit and scope of the invention.

Figure 1:
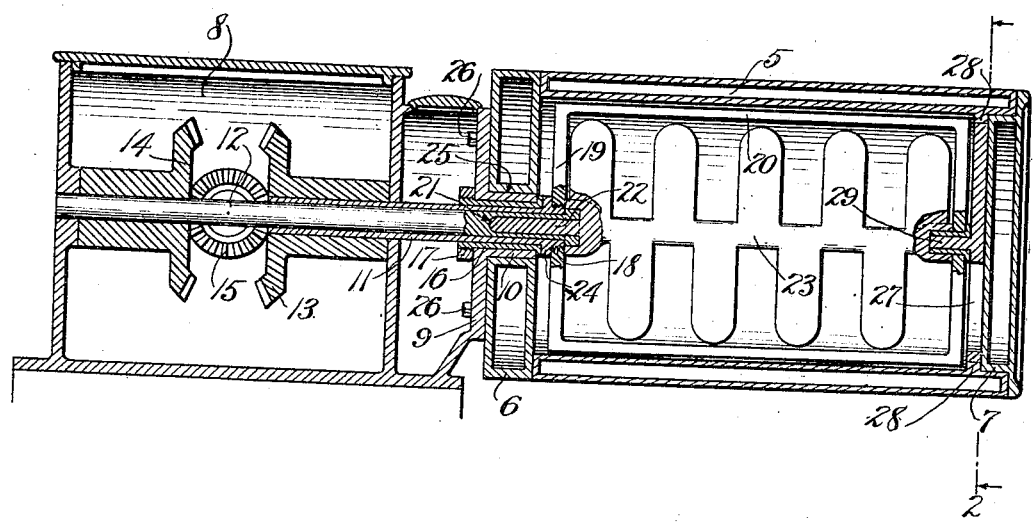

Figure 1 of said drawing is a longitudinal sectional view of the machine.

Figure 2:
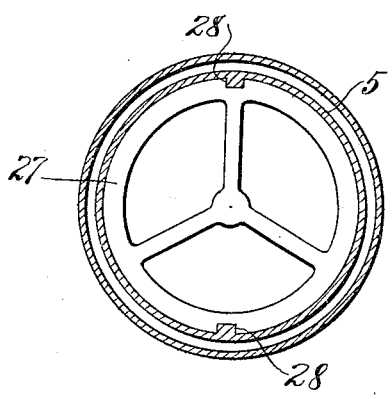

Fig. 2 is an end sectional view on substantially the plane of line 2—2 of Fig. 1.

The freezing vessel or "can" as it is sometimes called is of generally cylindrical shape and provided with the usual refrigerating and heat-insulating means. This vessel is designated 5 and is shown provided with a closed bottom or inner end 6 and an open outer end which may be closed by the cover 7.

8 designates the gear box which may be in general of the usual construction, but which is preferably provided as shown, with a relatively fixed or rigid supporting end wall 9 having a projecting hub 10. Journaled in this hub is a tubular shaft 11 and journaled within this tubular shaft is an inner shaft 12, said shafts being driven in reverse directions by the gears 13 and 14, which are meshed with the main drive gear 15. A lock bushing 16 seated in the hub 10 may provide the actual bearing surface for the tubular shaft and this bushing may carry a suitable stuffing box 17 at its outer end to prevent leakage.

The outer or exposed ends of the reversely rotating shafts are provided with coupling means by which the sections of the beater are engaged therewith, said means comprising in the present disclosure an externally screw-threaded extension 18 on the end of the tubular shaft to be engaged by an internally screw-threaded hub 19 on the scraper 20 and an angular socket 21 in the end of the inner shaft 12 to be engaged by an angular pin 22 on the inner end of the beater or paddle member 23. The tubular shaft preferably has a flange 24 forming a shoulder at the back of the screw-threaded extension and providing a stop against which the hub 19 may abut. This flange it will be noted is of somewhat less diameter than the bearing hub 10.

The freezing vessel is constructed with an opening 25 in the bottom thereof to fit closely over the projecting hub of the gear box and after being thus engaged over the hub the vessel is secured fast to the supporting wall 9 as by means of the bolts 26. This construction, it will be evident, permits the gear box and the freezing vessel to be treated as separate units, said units being assembled by simply engaging the freezing vessel over the hub of the gear box and securing the same in such position by the bolts described. It will be noted that the projecting flange 24 of the tubular shaft does not interfere with the assemblage or separation of these units inasmuch as it is of no greater diameter than the hub 10.

The parts thus far described provide an effective support for the inner ends of the reversely rotating beater sections. The outer ends of said beater elements are supported on a spider-like element 27 removably seated in the open end of the vessel and held against rotation therein as by suitable keying means 28, said spider carrying at its center a bearing 29 on which the outer end portions of the beater members are rotatably engaged. This spider it will be noted is mounted in the vessel inside the cover and supports the beater wholly independently of the cover, thus permitting removal of the cover and the observation of the working parts while the machine is in operation. This is particularly desirable when setting up the parts, to observe the fit of the scraper blades with respect to the walls of the cylinder. This construction also avoids the sagging of the outer end of the beater which frequently occurs in machines constructed prior to my invention and wherein the beater is supported on a pin carried by the removable cover.

I claim:—

1. An ice cream freezer comprising a freezing vessel provided at one end with a removable head, a beater supported on a bearing at the opposite end of such vessel, driving gearing connected with said supported end of the beater, and a bearing for the opposite outer end of the beater non-rotatably mounted in the vessel inside the removable head and supporting the beater independently of said head, whereby said beater may be operated with the head removed and while the vessel is open.

2. An ice cream freezer, comprising a freezing vessel provided at one end with a removable head, a beater supported by a bearing in the opposite end of said vessel, driving gearing connected with said supported end of the beater, and a bearing for the opposite outer end of the beater non-rotatably and removably held in the vessel inside the removable head and supporting the beater independently of said head.

3. An ice cream freezer, comprising a freezing vessel provided with a removable head at one end and provided with a bearing at the opposite end for a beater, a spider removably engaged in the open end of the vessel, a beater journaled at one end in the bearing in the end of the vessel and supported on said spider at its opposite end, and a cover for closing said open end of the vessel.

4. An ice cream freezer, comprising a freezing vessel provided with a removable head at one end and having a bearing in its opposite end, a beater having reversely rotating members journaled at one end in said bearing, a spider removably and non-rotatably engaged in the open end of the vessel inside the removable head and provided with a bearing for supporting the reversely rotating sections of the beater, and gearing for driving the reversely rotating sections of the beater.

In testimony whereof I affix my signature.

ALBERT T. LIGHT.